(12) United States Patent
Lin

(10) Patent No.: US 7,226,026 B2
(45) Date of Patent: Jun. 5, 2007

(54) SUCTION DEVICE

(76) Inventor: Christina Lin, 14F-3, No. 137, Sec. 1, Fushing S. Rd., Taipei (TW)

( * ) Notice: Subject to any disclaimer, the term of this patent is extended or adjusted under 35 U.S.C. 154(b) by 107 days.

(21) Appl. No.: 11/157,875

(22) Filed: Jun. 22, 2005

(65) Prior Publication Data

US 2006/0289708 A1 Dec. 28, 2006

(51) Int. Cl.
*A45D 42/14* (2006.01)
*F16B 47/00* (2006.01)

(52) U.S. Cl. .............. 248/205.5; 248/206.2; 248/205.8; 248/205.9; 248/683; 248/363; 248/362; 248/276.1; 248/278.1; 248/284.1; 248/183.1

(58) Field of Classification Search ............ 248/205.5, 248/206.2, 205.8, 205.9, 683, 363, 362, 276.1, 248/278.1, 284.1, 183.1
See application file for complete search history.

(56) References Cited

U.S. PATENT DOCUMENTS

| | | | | | |
|---|---|---|---|---|---|
| 4,580,751 | A | * | 4/1986 | Panzer | 248/205.8 |
| 4,813,640 | A | * | 3/1989 | Perentin | 248/205.8 |
| 5,065,973 | A | * | 11/1991 | Wang | 248/362 |
| 5,193,776 | A | * | 3/1993 | Nagai et al. | 188/67 |
| 5,423,466 | A | * | 6/1995 | Moon | 224/324 |
| 5,970,860 | A | * | 10/1999 | Yip | 99/510 |
| 6,193,197 | B1 | * | 2/2001 | Lian | 248/206.2 |
| 6,234,435 | B1 | * | 5/2001 | Yeh | 248/205.5 |
| 6,478,271 | B1 | * | 11/2002 | Mulholland | 248/205.8 |
| 6,488,321 | B1 | * | 12/2002 | Huang | 294/64.1 |
| 6,502,794 | B1 | * | 1/2003 | Ting | 248/206.2 |
| 6,749,160 | B1 | * | 6/2004 | Richter | 248/206.2 |
| 6,896,228 | B1 | * | 5/2005 | Lu | 248/205.8 |
| 6,942,188 | B2 | * | 9/2005 | Tsay et al. | 248/205.8 |
| 6,942,190 | B1 | * | 9/2005 | Lu | 248/309.3 |
| 6,966,530 | B2 | * | 11/2005 | Hsu | 248/206.2 |
| 7,007,908 | B2 | * | 3/2006 | Tsay | 248/309.3 |
| 7,124,985 | B2 | * | 10/2006 | Crain et al. | 248/188.8 |
| 2005/0103962 | A1 | * | 5/2005 | Tsay et al. | 248/317 |
| 2005/0109899 | A1 | * | 5/2005 | Yeh | 248/205.5 |
| 2006/0027720 | A1 | * | 2/2006 | Wu et al. | 248/205.5 |

* cited by examiner

*Primary Examiner*—Carl D. Friedman
*Assistant Examiner*—Nkeisha J. Dumas
(74) *Attorney, Agent, or Firm*—Rosenberg, Klein & Lee

(57) ABSTRACT

A suction device includes a suction cup having a peg extending therefrom and a transverse shaft extending in opposite directions from the peg, an inner cap positioned on the suction cup and retaining a spring that applies a restoring force to the suction cup, and an outer cap positioned on the inner cap and defining inclined slots in which the opposite ends of the shaft are movably received, respectively. By rotating the outer cap with respect to the inner cap causes camming action between each inclined slot and the respective end of the shaft, which in turn imposes a driving force on the peg to deform the suction cup thereby inducing a suction force. An elongate flexible member has a first end coupled to the inner cap and an opposite second end rotatably supporting an article receptacle in which an article, such as mobile phone and a personal digital assistant can be received and retained.

2 Claims, 4 Drawing Sheets

SUCTION DEVICE

BACKGROUND OF THE INVENTION

1. Field of the Invention

The present invention generally relates to a manually-operated suction device, and in particular to a suction device that attaches/separates an article, such as a mobile phone and a personal digital assistant (PDA), to/from a smooth flat surface by rotating a rotatable cap to cause/release deformation of a suction cup, which induces a suction force between the cup and the surface due to pressure difference.

2. The Related Art

It is common to retain a mobile phone or a PDA on a designated sites, such as inside a car or on a office table, by a mobile phone holder, to allow a mobile phone user to take an incoming call or make an outgoing call without hand holding the phone, whereby the user is allowed to proceed with what is being done without interference caused by operating the phone.

A conventional mobile phone holder employs fasteners, such as bolts, to fix the holder to the designated site. Using bolts to fix the mobile phone holder usually causes damage to the surface to which the holder is attached. Further, the holder is not allowed to readily move to other sites. Another way to fix the mobile phone holder to a fixed surface is employing adhesives to adhesively attach the holder to the surface. Similarly, fixing the holder with adhesives does not allow the holder to be readily moved. In addition, an adhesive mark is often left on the fixed surface once the holder is removed from the fixed surface. Such a mark is difficult to clean off.

Another conventional device for fixing a mobile phone holder to a fixed surface is a suction cup, which comprises a deformable cup that deforms to induce pressure difference by which a suction force is caused to fix the holder. The suction force is generally dependent upon the projected area of the cup. A small cup usually leads to a small and insufficient suction force that cannot firmly and stably supports a mobile phone or other objects. However, a large cup requires a large footprint on the fixed surface, which causes inconvenience in operating the suction cup. In addition, the large cup often deteriorates overall surface aesthetics, due to occupation of large space.

Thus, it is desired to have a suction device that overcomes the problems discussed above.

SUMMARY OF THE INVENTION

An objective of the present invention is to provide a suction device comprising a rotatable cap which, after rotation in a predetermined direction, causes deformation of a deformable suction cup to induce a suction force for attaching the suction device to a smooth fixed surface, and which, due to rotation in an opposite direction, releases the deformation of the cup and thus the suction force to allow removal of the suction device from the fixed surface, whereby operation efficiency of the suction device is enhanced.

To achieve the above objective, in accordance with the present invention, there is provided a suction device comprising a suction cup having a peg extending therefrom and a transverse shaft extending in opposite directions from the peg, an inner cap positioned on the suction cup and retaining a spring that applies a restoring force to the suction cup, and an outer cap positioned on the inner cap and defining inclined slots in which the opposite ends of the shaft are movably received, respectively. By rotating the outer cap with respect to the inner cap causes camming action between each inclined slot and the respective end of the shaft, which in turn imposes a driving force on the peg to deform the suction cup thereby inducing a suction force. An elongate flexible member has a first end coupled to the inner cap and an opposite second end rotatably supporting an article receptacle in which an article, such as mobile phone and a personal digital assistant can be received and retained.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
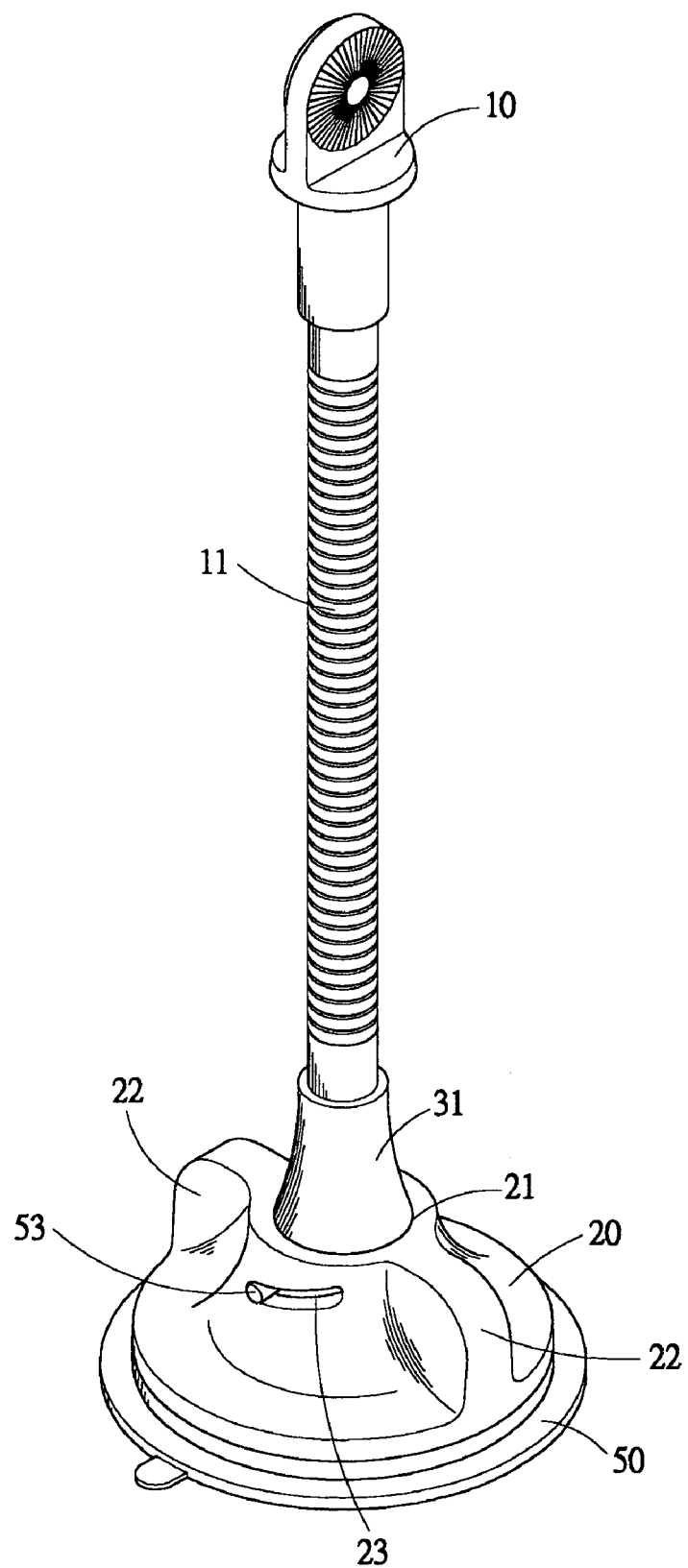
FIG. 1 is a perspective view of a suction device constructed in accordance with the present invention.
Figure 2:
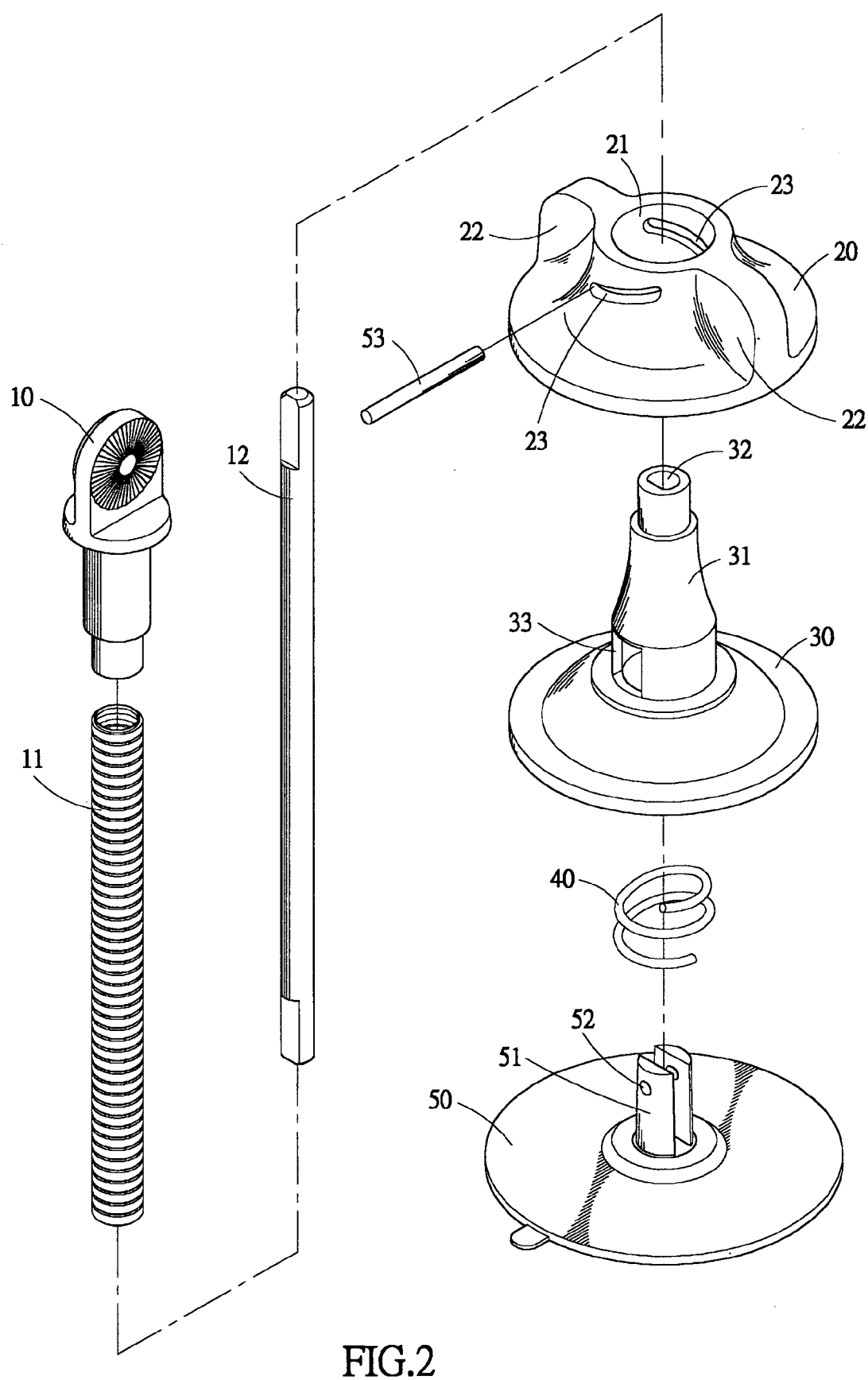
FIG. 2 is an exploded view of the suction device of the present invention.

With reference to the drawings and in particular to FIGS. 1 and 2, which show, respectively, a perspective view and an exploded view of a suction device constructed in accordance with the present invention, comprises a deformable suction cup 50, a resilient member 40, an inner presser cap 30, an outer rotatable cap 20, and an article support member 10.

Figure 4:
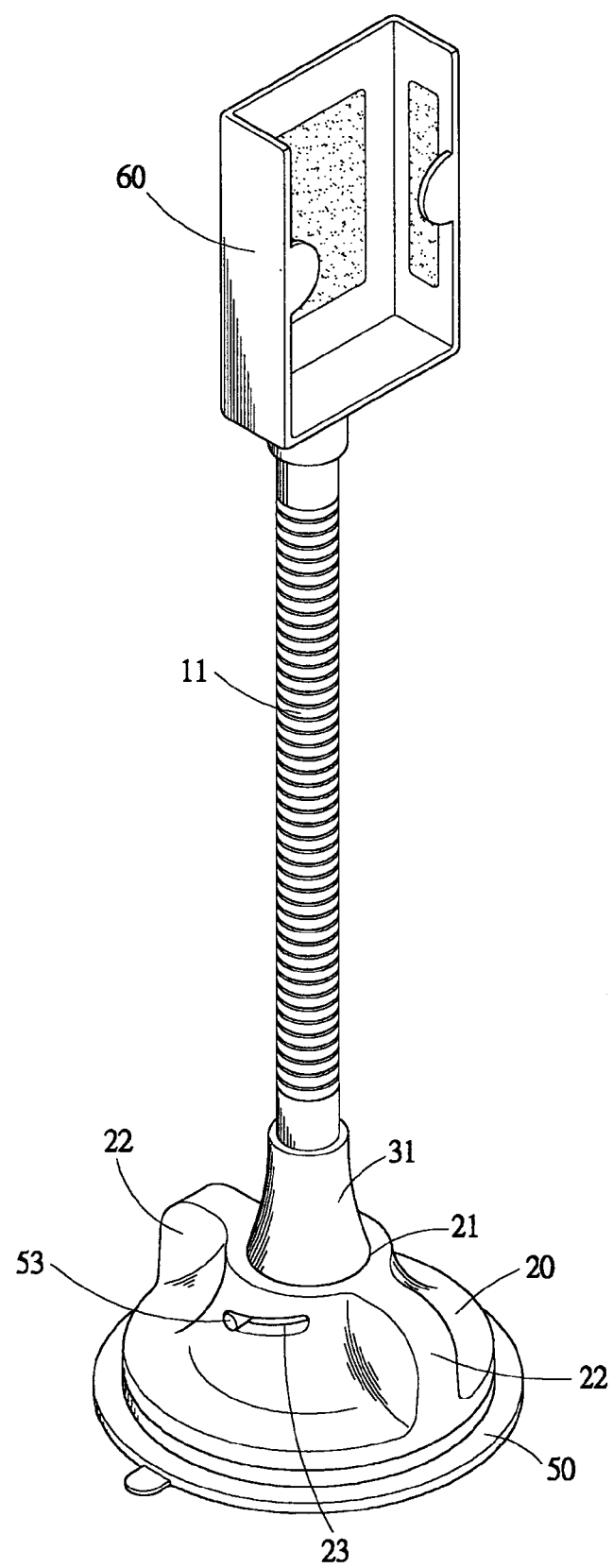
FIG. 4 is a perspective view illustrating a practical application of the suction device as a mobile phone holder or an article holder.

Also referring to FIG. 4, which shows a perspective view illustrating an application of the suction device of the present invention, the article support member 10 that is supported by a flexible tube 11 and a flexible bar 12 extending from the inner cap 30 rotatably supports an article receptacle 60 in which an article, such as a mobile phone and a PDA (not shown) can be received and retained.

As shown in FIG. 2, the flexible tube 11 and the flexible bar 12 that is received in and co-extends with the flexible tube 11 in a coaxial manner are mounted, at upper ends thereof, to a lower end of the article support member 10 and opposite lower ends of the tube 11 and the bar 12 are fixed to the inner cap 30, whereby the article receptacle 60 is mounted to the suction device by the tube 11 and the bar 12. The article support member 10 can be mounted to the upper ends of the tube 11 and the bar 12 in any known manner. In the embodiment illustrated, the article support member 10 has a cylindrical lower projection over which an upper open end of the tube 11 is tightly fit, preferably with resilient deformation of the tube 11, whereby the article support member 10 is securely fixed to the tube 11. A lower end face of the lower projection of the article support member forms a bore sized and shaped to receive and retain an upper end of the bar 12. Due to the flexibility of the bar 12 and the tube 11, the bar 12 and the tube 11 are deflectable to orient the article support member 10 in a desired direction.

Figure 3:
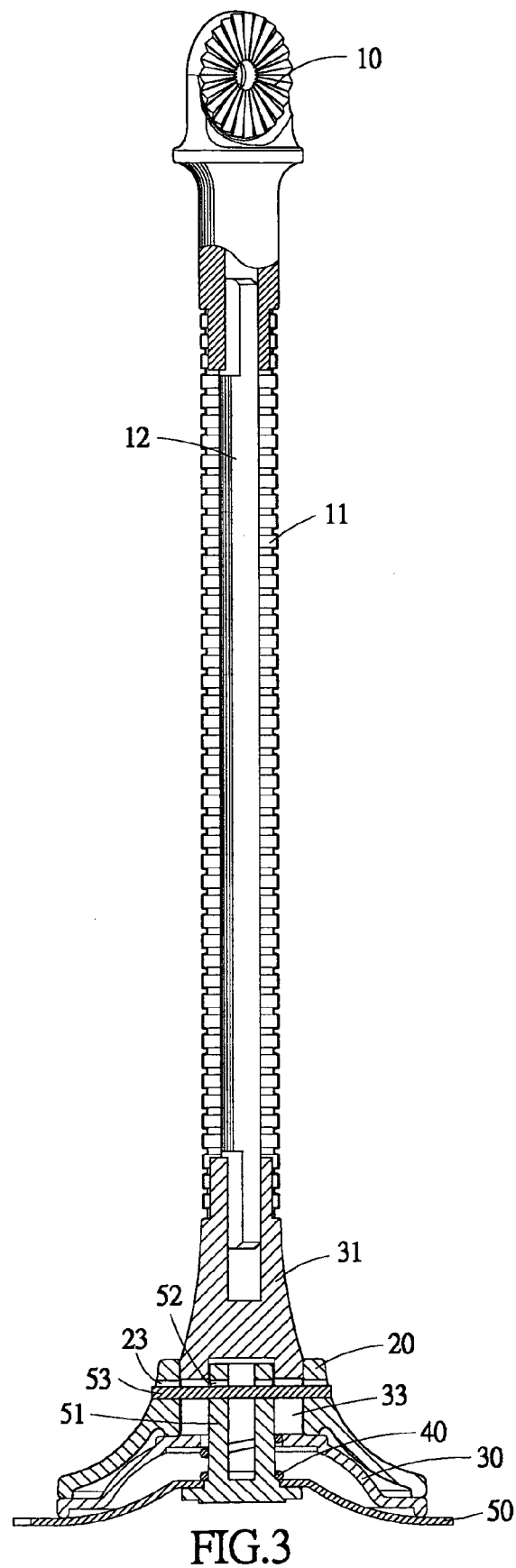
FIG. 3 is a cross-sectional view of the suction device of the present invention.

Also referring to FIG. 3, the outer cap 20 is positioned on the inner cap 30. The outer cap 20 forms a central raised portion (not labeled) through which a bore 21 is defined. Protrusions 22, preferably radially extending and aligning with each other along a diameter of the outer cap 20, are formed on an outer surface of the outer cap 20, on opposite sides of the raised portion, to serve as a manual rotation knob. Elongated slots 23 are defined in a circumferential wall of the raised portion and in communication with the bore 21. The slots 23 are diametrically symmetrical and are inclined at a predetermined angle with respect to the plane of a fixed surface to which the suction device is to be attached.

The inner cap 30, on which the outer cap 20 is positioned, forms a central projection 31 that is received in the central bore 21 of the outer cap 20 with a top end section axially extending beyond the bore 21. The projection 31 of the inner cap 30 and the bore 21 of the outer cap 20 are configured and sized to allow ready rotation and axial movement of the projection 31 inside the bore 21. An upper end face of the top end section of the projection 31 forms a blind hole or upper bore 32 into which the lower end of the bar 12 is receivable. Also, the top end section of the projection 31 is sized to securely fit into a lower open end of the tube 11. A lower bore (not labeled) is defined in a lower central portion of the projection 31 and forming an opening for connection with the deformable suction cup 50. The lower bore is delimited by a circumferential wall in which openings 33 corresponding in position to the inclined slots 23 of the outer cap 20 are defined.

The suction cup 50 comprises a substantially flat, flexible and deformable plate from which a peg 51 extends in an upward direction. Preferably, the peg 51 is substantially located at a center of the deformable plate of the cup 50. The peg 51 is preferably comprised of two separate halves in which radially extending and diametrically aligning holes 52 are defined. Alternatively but not shown in the drawings, the peg 51 can be a single unitary member in which a diametrically extending hole 52 is defined. The peg 51 is received in the lower bore of the inner cap 30 with the holes 52 corresponding in position to the openings 33. A shaft 53 is received in the hole 52 of the peg 52 of the suction cup 50 with opposite ends extending through the openings 33 of the inner cap 30 and further through and movably received in the inclined slots 23 of the outer cap 20.

The peg 51 can be integrated with the deformable plate of the suction cup 50. Or alternatively and as shown in the drawings, the peg 51 is a separate part, which extends through a central bore of the deformable plate of the suction cup 50 and forms an airtight engagement therebetween.

The spring 40, which in the embodiment illustrated is a helical spring, is fit over the peg 52 and fixed between the inner cap 30 and the deformable plate of the suction cup 50. The spring 40 functions to restore the suction cup 50 back into the original shape after forced deformation of the deformable plate is released.

To operate, the outer cap 20 is manually rotated about the projection 31 of the inner cap 30, in a predetermined manner, by applying forces to the protrusions 22 of the outer cap 20, which induces a torque to drive the rotation of the outer cap 20. The rotation of the outer cap 20 causes camming action between the shaft 53 and the inclined slots 23 of the outer cap 20, which induces an upward driving force acting upon the peg 51 of the suction cup 50, causing upward movement of the peg 51 and deformation of the deformable plate of the suction cup 50. The deformation of the deformable plate, in turn, causes a pressure difference between inside and outside of the suction cup 50, if the deformable plate is firmly positioned on a smooth and flat fixed surface. The pressure difference generates a suction force that attaches the suction cup 50, and thus the inner and outer caps 30, 20 and the article support member 10 that is coupled to the inner cap 30 by the tube 11 and the bar 12, to the fixed surface.

To remove the suction device from the fixed surface, the outer cap 20 is rotated in an opposite direction, whereby the inclination of the slots 23 of the outer cap 20 allows the shaft 53 to move in such a direction to release the upward driving force of the peg 51 and thus, the deformable plate of the suction cup 50, under the action of the spring force of the spring 40, returns to its original shape, which releases the deformation of the plate and the pressure difference between inside and outside of the suction cup 50 and thus removing the suction force and allowing the suction device to be detached from the fixed surface.

To summarize, the suction device of the present invention makes use of the camming action induced on the shaft 53 by the inclined slots 23 to forcibly deform the suction cup 50, causing pressure difference between inside and outside the suction cup 50 to generate the suction force that attaches the suction device to a fixed surface. The camming engagement between the shaft 53 and the inclined slots 23 allows the suction device to deform the suction cup 50 without a complicated structure and requiring no occupation of large space. Operation of the suction device is also enhanced and efficient, whereby detachment and re-attachment of the suction device can be easily done, and thus moving the suction device between different locations can be readily effected.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A suction device comprising:
   a suction cup comprising a deformable body adapted to position on a flat fixed surface, and a peg extending from the body and defining a transverse through hole in which a shaft is received, opposite ends of the shaft extending beyond the hole;
   an inner cap defining a lower bore receiving the peg therein and defining opposite openings through which the ends of the shaft extend, the inner cap forming an upper projection in which an upper bore is defined;
   a resilient member interposed between the inner cap and the body of the suction cup;
   an outer cap defining a bore through which the upper projection of the inner cap extends, and two inclined slots on opposite sides of and in communication with the bore to movably receive the ends of the shaft therein;
   an article support member adapted to rotatably support an object, the article support member being coupled to the inner cap by a flexible member
   wherein rotation of the outer cap about the upper projection of the inner cap in a predetermined direction causes a camming action between the shaft and the inclined slots, which imposes a driving force to the peg of the suction cup to induce a deformation of the body of the suction cup, causing the body to change from an original shape to a deformed shape, whereby a pressure difference is generated between inside and outside the body of the suction cup to provide a suction force that securely attaches the suction device to the fixed surface and wherein rotation of the outer cap in an opposite direction removes the driving force and allows the body of the suction cup to restore to the original shape under the action of a restoring force induced by the resilient member, thereby releasing the suction force.

2. The suction device as claimed in claim 1, wherein the outer cap comprises outer protrusions serving as rotation knob for manual rotation of the outer cap.

* * * * *